July 15, 1941.  J. A. CHAPPUIS  2,249,113
MACHINE FOR MAKING WASHERS OR THE LIKE
Filed Nov. 14, 1939  10 Sheets-Sheet 1
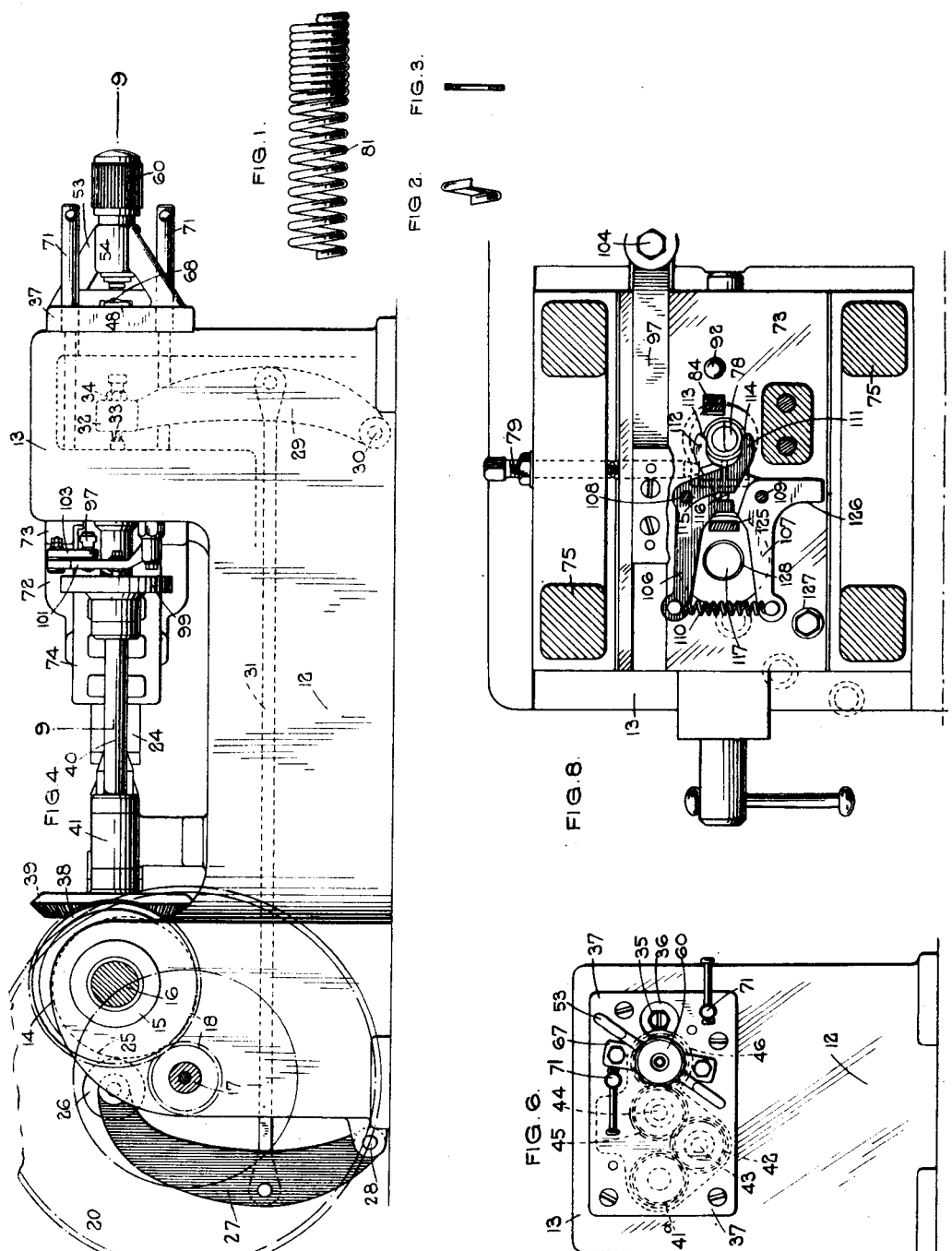

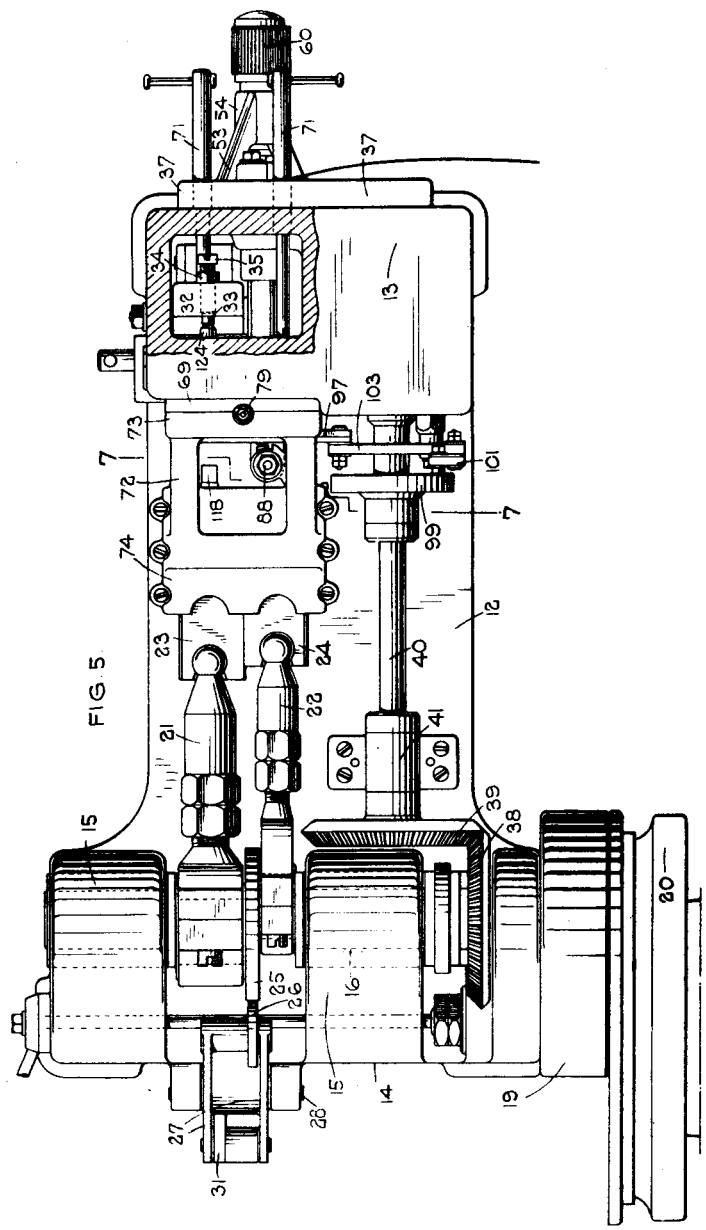

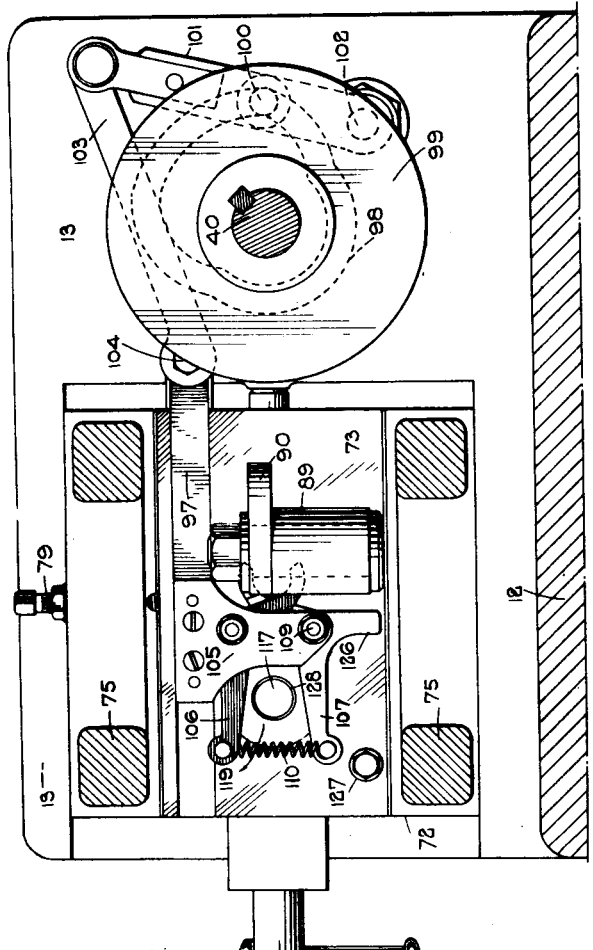

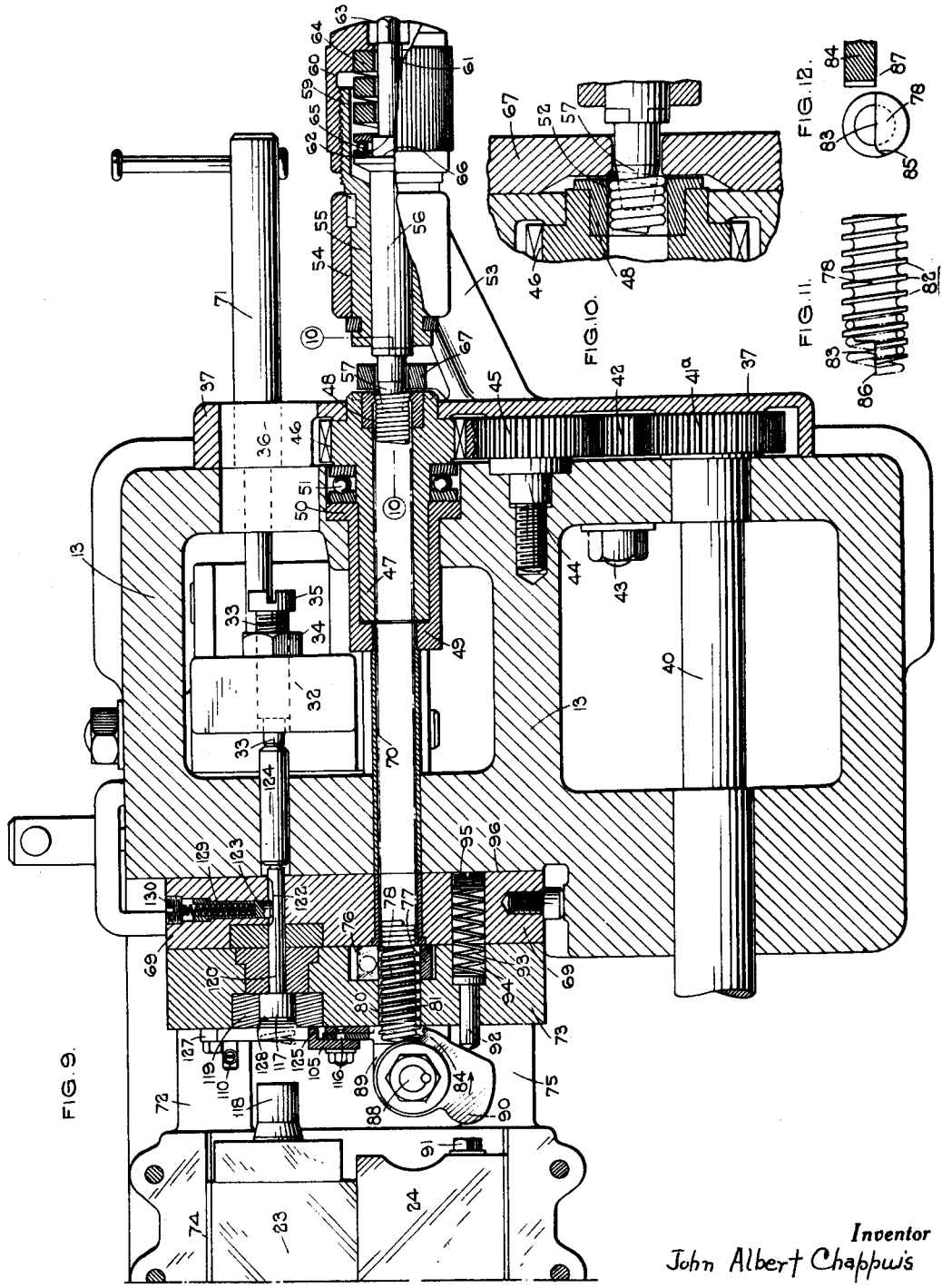

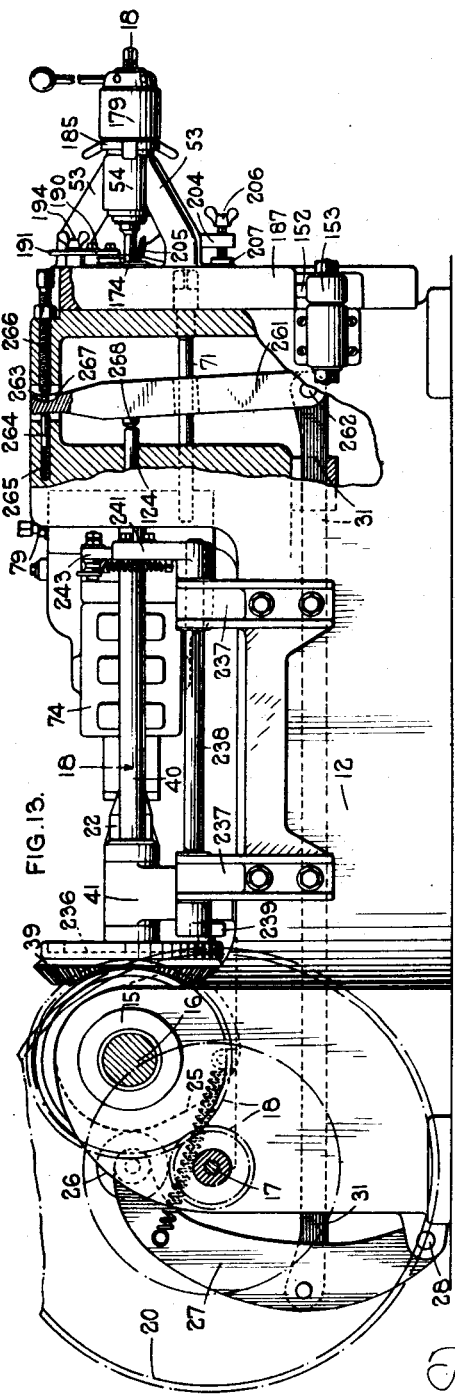

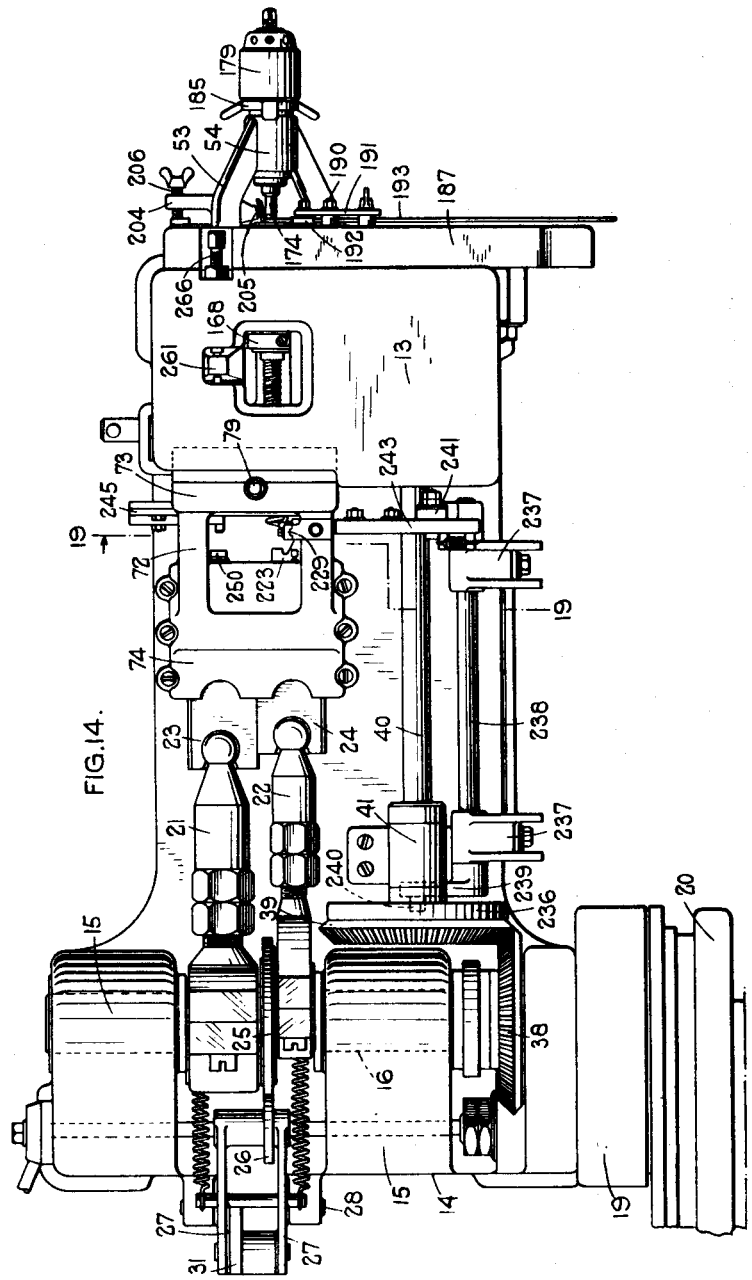

July 15, 1941.  J. A. CHAPPUIS  2,249,113
MACHINE FOR MAKING WASHERS OR THE LIKE
Filed Nov. 14, 1939    10 Sheets-Sheet 7
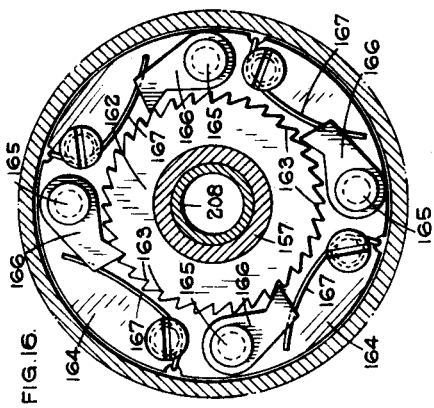
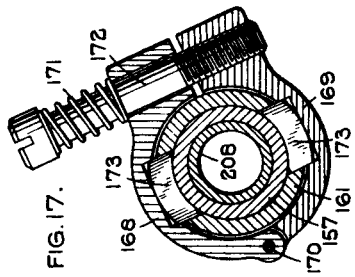
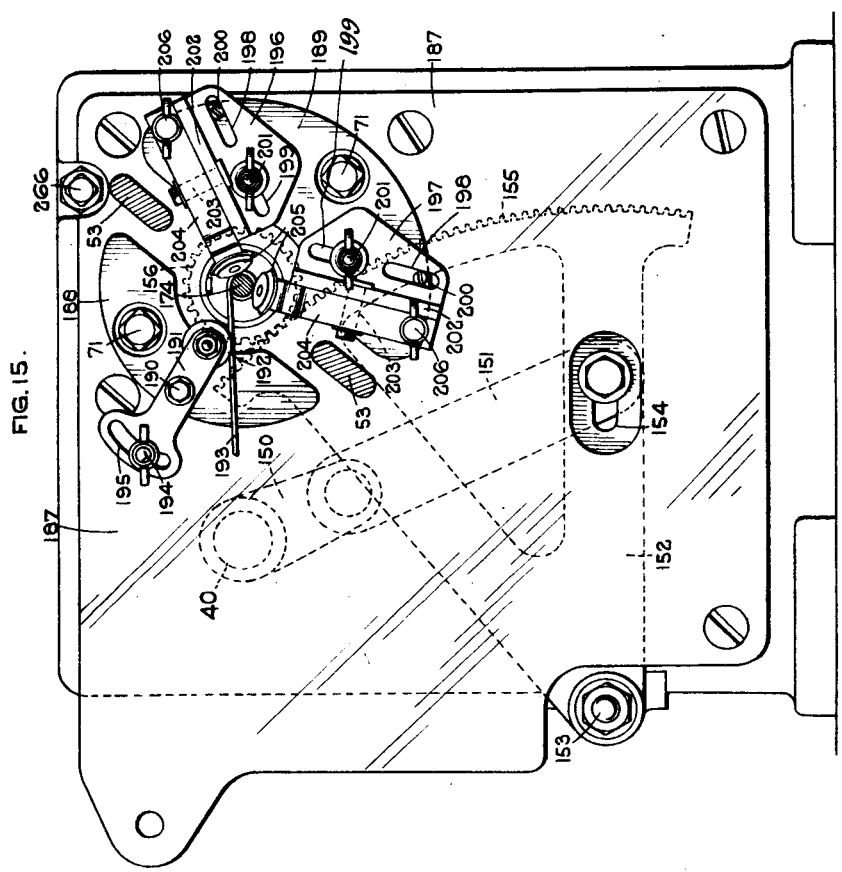
Inventor
John Albert Chappuis
by
Taulmin & Taulmin
Attorneys

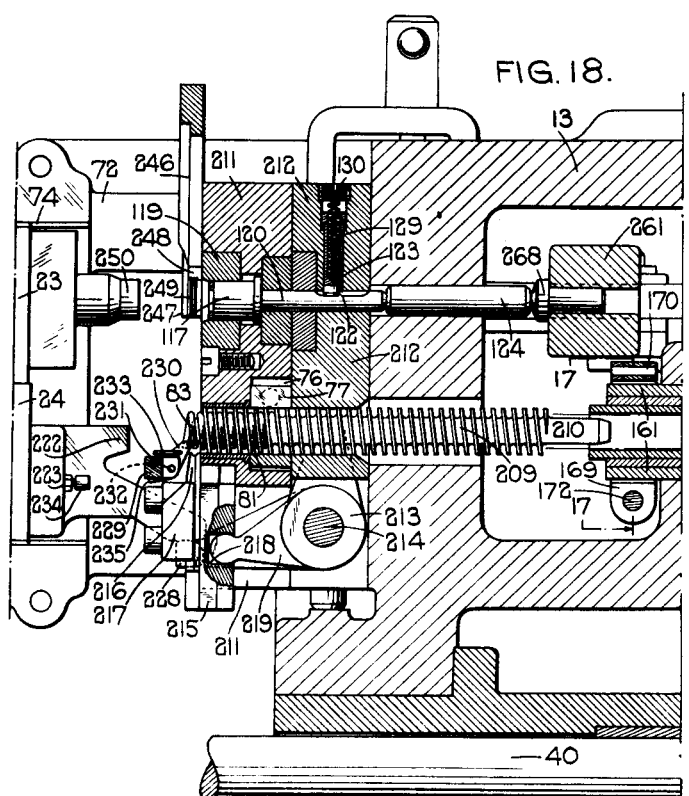

July 15, 1941. J. A. CHAPPUIS 2,249,113
MACHINE FOR MAKING WASHERS OR THE LIKE
Filed Nov. 14, 1939 10 Sheets-Sheet 10

Inventor
John Albert Chappuis
by
Taulmin & Taulmin
Attorneys

Patented July 15, 1941

2,249,113

UNITED STATES PATENT OFFICE 2,249,113

MACHINE FOR MAKING WASHERS OR THE LIKE

John Albert Chappuis, Neuchatel, Switzerland

Application November 14, 1939, Serial No. 304,442
In Great Britain November 18, 1938

14 Claims. (Cl. 10—73)

The object of the present invention is to provide a machine whereby washers and other rings may be made from wire.

The machine comprises means for producing metal wire rings, means for feeding the rings individually into a pair of grippers, said grippers being mounted on a slide, and means for reciprocating the slide so that the grippers convey the rings one by one from the feeding point to the pressing tools where they are pressed into thin flat section.

The machine may comprise means for coiling wire helically, means for severing elements consisting of individual turns or pairs or groups of turns of the coil in succession, tools for pressing each severed element into a thin flat section ring, a conveyor for moving the elements to the tools, and ejector means for removing the pressed elements from the die.

In cases where the metal rings are produced by coiling metal wire and severing the turns one by one, the machine may include means for axially separating the individual turns prior to severing, and such means may constitute an interior support for the end turn of the coil so that it can be acted upon by an exterior and inwardly moving cutter which co-operates with the end portion of the support to sever the turn by a shearing action.

In cases where the metal rings are to be produced by coiling wire helically and severing the turns, the wire coiling means may comprise a positively driven sleeve and a spring-loaded taper pin projecting into the end of the sleeve, the wire being gripped between the said pin and the rotating sleeve.

These and other novel features of my invention are described in detail in the following description and are set out in the claims.

Referring to the drawings—

Figure 1 is a view in side elevation showing the wire after the first stage of treatment in the machine.

Figure 2 is a side view showing one of the severed turns of wire.

Figure 3 is a sectional view showing the completed washer.

Figure 4 is a view of the machine in side elevation.

Figure 5 is a plan view.

Figure 6 is an end view of the machine looking on the right-hand end of Figure 4.

Figure 7 is a section on line 7—7 of Figure 5.

Figure 8 is a view in transverse section showing the conveyor.

Figure 9 is a section on line 9—9 of Figure 4.

Figure 10 is a section on line 10—10 of Figure 9.

Figure 11 is a detail view in side elevation showing the helical guide for the wire coil.

Figure 12 is an end view partly in section to illustrate the severing means.

Figure 13 is a view of a further construction of the machine in side elevation partly in section.

Figure 14 is a plan view.

Figure 15 is a view in end elevation showing the wire guiding means and part of the driving gear for the coiling sleeve.

Figure 16 is a section on line 16—16 of Figure 18A.

Figure 17 is a section on line 17—17 of Figure 18.

Figure 18 is a section on line 18—18 of Figure 13, showing the cutting off means and also the ejector.

Figure 20 is a sectional view in side elevation showing the gripper of the conveyor and the punch of the press tools.

Figure 18A:
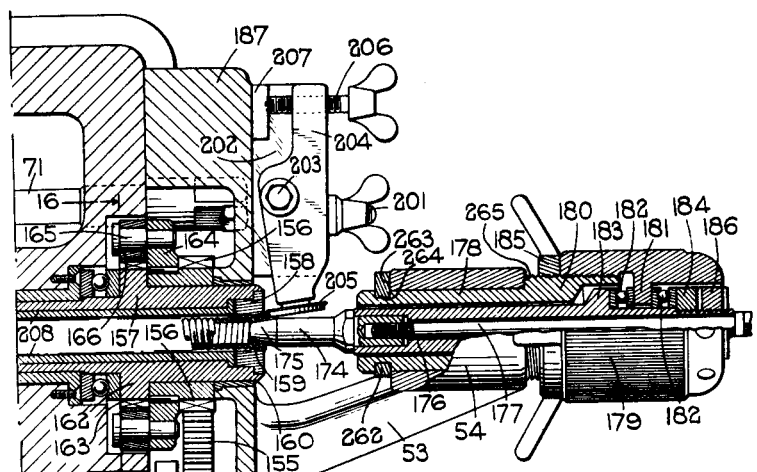
Figure 18A is a section on line 18—18 of Figure 13 showing the coiling means.

In the construction illustrated in Figures 1 to 12, the machine comprises a body 12 having raised ends 13 and 14.

As seen from Figure 5, the end 14 is wider than the end 13, and it includes bearings 15 for a driving shaft 16. This driving shaft 16 is driven by a power shaft 17 through the medium of gearing 18 enclosed in a casing 19. The power shaft 17 is provided with a fly wheel 20.

Between two of the bearings 15 the driving shaft 16 is provided with cranks upon which are mounted connecting rods 21 and 22, these connecting rods being of known construction and being connected respectively to slides 23, 24 which they reciprocate.

On the driving shaft 16 between the connecting rods 21 and 22 is a cam 25 engaging a roller 26 carried by levers 27, these levers being arranged side by side and being coupled together. The levers 27 are pivoted at 28 to the body of the machine.

At the opposite end 13 of the body is a further lever 29 pivoted at 30 and coupled to the levers 27 by a link 31, the arrangement being such that the lever 29 oscillates in unison with the levers 27. The upper end 32 of the lever 29 is provided with a set screw 33 locked by a nut 34, the arrangement being such that the set screw can be adjusted by turning the head 35 which is accessible through an opening 36. This opening occurs both in the body of the machine and in a plate 37 which is attached to the end 13 of the machine.

The driving shaft 16 is provided with a bevel wheel 38 which engages with a further bevel wheel 39 on a transmission shaft 40 supported in a bearing 41 and in the end 13 of the body. This transmission shaft 40 is used for driving the wire coiling mechanism and also for operating the conveyor. The shaft 40 passes through the part 13 of the body and is provided with a gear wheel 41ª which is exterior to the body. The gear wheel 41ª engages with a gear wheel 42 mounted on a spindle 43 attached to the end of the body, and the gear wheel 42 engages with a gear wheel 45 mounted on a spindle 44 attached to the body. The gear wheel 45 engages a gear wheel 46 which is formed with a sleeve portion 47 and which carries a wire coiling sleeve 48 at its outer end.

The gearing 41ª, 42, 45, 46, is enclosed by the cover plate 37 already referred to.

The part 13 of the body carries a sleeve 49 which serves as a bearing for the sleeve 47. The sleeve 49 is provided with a flange 50 between which and one side of the gear wheel 46 is a ball thrust bearing 51.

The wire coiling sleeve 48 is mounted in the end of the gear wheel 46 so that it is driven thereby. As shown, it has two radial slots engaging teeth on the end of the gear wheel, but it may be screwed in or keyed or splined.

Further, at its outer end the sleeve 48 is provided with a tapered part 52 adapted to be engaged by the wire to be coiled.

On the outer side of the plate 37 is formed integrally a bracket 53 having a tubular part 54 which carries a non-rotating sleeve 55. Slidably mounted in this sleeve is an inner sleeve 56 carrying a removable pin 57 which is tapered to agree with the taper 52 and projects into the interior of the sleeve 48.

The pin 57 fits into the end of, and is in driving engagement with, the sleeve 56, and is engaged by the screw threaded end of a pin 61. The pin 61 is shouldered, and the shoulder engages the end 62 of the sleeve 56.

Both the sleeve 48 and the pin 57 are readily removable and can be replaced by parts of similar design but of other diameters, so that provision is made for coiling wire to various diameters.

Screwing on to an extension 59 of the sleeve 55 is a cap 60, and within this cap is a strong spring 64, this spring engaging a ball thrust bearing 65 which abuts against a shoulder 66 formed on the sleeve 56. The spring 64 is thus urging the sleeve 56, and with it the pin 57, to the left as seen in Figure 9. Spring pressure on the sleeve 56 and pin 57, however, can be released by unscrewing the cap 60.

A bridge plate 67 is secured to the plate 37 across the end of the sleeve 48. This bridge plate 67 is provided with a groove 68 (see Figure 4) into which the end of the wire to be coiled can be fed. The wire is thus constrained to enter the space between the tapered part 52 of the sleeve 48 and the tapered pin 57, and the end of the wire is gripped by reason of the fact that the pin 57 is urged towards the left (see Figures 9 and 10) by the spring 64.

The sleeve 48 is being positively driven so that the wire is thus drawn into the sleeve 47 and coiled during the process.

Connecting the inner end of the sleeve 49 with a plate 69 is a tube 70 through which the coiled wire passes. The plate 69 is held against the face 96 of the part 13 of the body by bolts 71 passing through this part of the body, and the same bolts are used to hold in position a block 72. This block 72 has a flange 73 at one end which abuts against the plate 69, and the block 72 also has a portion 74 which forms a guide for the slides 23 and 24. The parts 74 and 73 are connected together by four integral legs 75.

One end of the part 73 is provided with a recess 76 in which is mounted a split collar 77 embracing a helically grooved guide 78 (see Figures 9 and 11). The split collar 77 is acted upon by a set pin 79 so that it can be contracted to grip the exterior of the guide 78. The guide 78 is centred in the hole 80 in the part 73.

The primary purpose of the guide 78 is to separate the end coils 81 of the helically coiled wire. The wire is closely coiled by the parts 52 and 57, and moves along the tube 70 as a closed coil, but when its leading end engages the guide 78, its end coils are separated by the helical rib 82 of the guide 78.

Further, at its end the guide 78 is of stepped form as shown clearly in Figures 11 and 12, the step 83 co-operating with a shear cutter 84 which severs the end coil of the wire. As will be seen from Figure 12, the stem 83 terminates in a radius 85, so that the end of the wire which forms the coil which is rotating about its own axis will not foul or catch upon the step.

It will be appreciated that the act of severing the wire arrests the rotation of one end of the coil, while the rotation at the feed end continues, so that a torsion is applied to the coil until the cutter makes its return stroke. When the cutter makes its return stroke, the adjacent end of the coil rotates with a snap action due to the torsion in the coil, and the end of the wire engages the side of the cutter or other stop means to arrest this rotation with the coil in position for the next severing operation. The cutter is of course driven from the same source as the coiling mechanism, so that the coils are severed at the same rate as that at which they are formed.

If required the lower surface 87 of the cutter 84 and the step 83 may be slightly inclined to the axis of the coil, so that the cut is slightly oblique, whereby when the severed turns reach the press tools, there will be no tendency for the ends of the wire to foul each other during pressing.

The shear cutter 84 has an oscillating motion, and it is mounted upon a spindle 88, this spindle being supported in a bearing bracket 89 secured to, or formed on, the part 73. The cutter 84 is formed integrally with an arm 90 which is acted upon by an adjustable abutment 91 secured to the slide 24 and is also acted upon by a spring-pressed pin 92. The pin 92 is acted upon by a spring 93 mounted in openings 94 formed in the part 73 and in the plate 69, the opposite end of the spring 93 abutting against a screwed plug 95.

The slide 24 is reciprocated by the connecting rod 22 to produce the shearing action, and the return movement is produced by the spring-pressed pin 92.

During the shearing action the metal adjacent the shearing cutter 84 is supported by the step 83, but when the wire has been sheared, the end turn which has now been severed is pushed bodily sideways by the cutter 84 into a conveyor.

The conveyor is mounted on a slide 97 to which a reciprocating action is imparted by means of a cam groove 98 in a disc 99 on the shaft 40. The cam groove is engaged by a pin 100 on a lever 101 pivoted at 102, and the lever 101 is connected by a link 103 at 104 to the slide 97.

The slide 97 carries a bracket 105, and pivoted on this bracket are two levers 106 and 107. The lever 106 is pivoted at 108, and the lever 107 is pivoted at 109. The two levers 106 and 107 are connected together by a tension spring 110. The lever 106 is provided with a second arm in the form of a jaw 111, and similarly the lever 107 has a second arm which is in the form of a jaw 112. The ends 113 and 114 of the jaws are formed obliquely or inclined to the line of movement of the slide 97, so that when the two jaws, which together form a gripper, move towards the coil, the coil can engage the surfaces 113 and 114 so that the jaws open and grip the end turn of the coil as shown in Figure 8.

The lever 106 is provided with a slot 115, and this slot is engaged by a pin 116 on the lever 107.

As the slide 97 moves to the left (see Figure 8), the grippers carry one turn of the coil with them and convey it to a position in which it is co-axial with the female die, which die comprises an anvil 117 which also acts as an ejector, and a collar or die 119.

The male die or punch 118 is carried by the slide 23.

As the punch 118 advances towards the anvil 117, the helical turn of wire held by the grippers 111 and 112 is pushed out of the grippers against the end face of the anvil 117.

As the turn of wire is helical (see the chain dot lines in Figure 9), the turn is held concentrically with the dies between the end faces of the anvil 117 and punch 118. This gripping of the turn by the dies takes place before the anvil 117 has moved back to its inward position after ejecting. As soon as the turn of wire is thus held between the faces of the dies, the grippers 111 and 112 make an opening movement due to the fact that the arm 126 comes into contact with an abutment 127 (see Figure 8). This opening movement is necessary in order to allow the punch 118 to pass through the grippers and to effect the pressing. When the pressing has been effected, the punch 118 makes its return movements, and the slide 97 then moves to the right (Figure 8). When the arm 126 makes contact with the abutment 127, the lever 107 is rocked with a slight opening movement, and this movement is also imparted to the other lever 106 by the pin 116.

The anvil 117 is movable in an endwise direction in the collar 119 which in the construction shown is of a diameter to receive the helical turn of wire as a sliding fit, so that when the punch 118 advances, it is able to cause the metal of the wire to flow radially and mainly inwardly to convert the circular section of the ring into a thin flat section as shown in Figure 9.

It will be appreciated that means for centering the elements relatively to the press tools are necessary in cases where the external diameter of the helical element is substantially less than the internal diameter of the collar or die 119, but in the case illustrated, the elements are of an external diameter enabling them to slide into the collar or die 119 and engage its internal surface so that they will automatically centre themselves therein. The entrance to the sleeve 119 may be chamfered as shown at 128, so that the element will readily pass into the collar 119. In this arrangement, the flow of the metal during the pressing operation is mainly inwards, and I may provide a central pin associated with the anvil 117 or with the punch 118 to limit its inward flow. In such an arrangement the elements may be pushed out of the grippers 111 and 112 by the punch 118, and before leaving the grippers a part of the element will have entered the end of the collar or die 119.

The anvil 117 is formed with, or attached to, a stem 120 upon which is formed a flat 122. Mounted in an opening in the plate 69 is a plunger 123 acted upon by a spring 129 which abuts against a plug 130. The plunger 123 engages the flat 122 and thus frictionally loads the stem 120 against movement. The stem 120 and anvil 117 will thus retain any position into which they are moved until they are mechanically operated in one direction or the other.

The body casting or portion 13 is provided with a push pin 124 which is acted upon by the pin 33 carried by the end 32 of the lever 29, the whole arrangement being such that after pressing has been effected and the punch 118 retracted, the lever 29 is rocked, operating the push pin and consequently the anvil 117 to push the completed washer out of the collar 119.

Should the washer adhere to the end of the anvil 117, a rib 125 on the bracket 105 moving with the slide 97 pushes the completed washer from the end of the anvil 117 before it is returned to the position shown in Figure 9.

It should be observed that the cam 14 is shaped and set to cause the ejector action to take place as the bracket 105 is moving towards the anvil 117, so that the rib 125 moves across the end of the anvil 117 just before that die co-operates with the punch 118 in gripping the next element, and just before the grippers bearing the next turn of wire reach the position in which the turn of wire is concentric with the press tools.

Although the drawings show the completed washer to be flat, it will be understood that the washer may be bevelled at its periphery if desired. This may be effected by modifying the press tools. For instance, the female die may be made in two parts, an outer part such as 119, having an internal shoulder which is conical, and an inner part, such as 117, which is disposed within the shoulder and which also acts as the ejector, the end surface of which part is flat.

Figures 13 to 21 inclusive show a modified construction of machine.

In the following description and in Figures 13 to 21 of the drawings the parts of the machine which are identical with those shown in Figures 1 to 12 of the drawings bear the same reference numerals as in those figures.

The following is a description of the modified coiling means and the driving gear therefor.

The transmission shaft 40 is provided with a crank 150, and this crank is connected by a link 151 to an oscillating toothed quadrant 152 pivoted at 153.

The arm of the quadrant 152 to which the link 151 is pivoted is provided with a slot 154 so that the angular movement imparted to the quadrant by the crank 150 can be varied as desired.

The teeth 155 of the quadrant 152 engage with the teeth of a pinion 156. This pinion is mounted for free rotation upon a sleeve 157 to which the coiling sleeve 158 having a tapering entrance 159 is attached.

The sleeve 157 is mounted in bearings 160 and 161 in the body of the machine.

Further, the exterior of the sleeve 157 is provided with a flange 162 having ratchet teeth 163 at its periphery.

Fixed by keys on the pinion 156 is a ring 164. This ring may be formed integrally with the pinion 156 if desired.

The ring carries four pivot pins 165, on each of which is mounted a pawl 166, each pawl being acted upon by a spring 167.

The pawls engage with the teeth 163 of the flange 162 on the sleeve 157.

The arrangement is such that the oscillation of the quadrant 152 oscillates the pinion 156 so that the ring 164 also oscillates and the pawls 166 impart to the sleeve 157 and consequently to the coiling sleeve 158 an oscillating motion. The driving gear is designed so that at each stroke in one direction, a rotary movement equal to, slightly more, or slightly less than one complete revolution of the sleeve 158 can be produced.

When the toothed quadrant 152 oscillates in the reverse direction, the pinion 164 is turned, but the pawls 166 ride over the teeth 163 and no motion in the reverse direction is imparted to the sleeves 157 and 158.

In order to prevent such reverse motion, a friction brake device illustrated in Figure 17 may be applied to the sleeve 157.

The bearing 161 is stationary, and the friction device encircles its end as shown in Figure 17. The friction device comprises a pair of jaws 168, 169, pivoted together at 170, and these are urged towards each other by a spring 171 on a screw 172 screwed into the jaw 169, the spring pressing against the head of the screw 172 and against the jaw 168.

The end portion of the bearing 161 is provided with two slots in which are situated brake blocks 173, and the friction device is thus prevented from rotating bodily. The pressure of the spring 171 is transmitted to the brake blocks 173 which bear upon the exterior of the sleeve 157.

Replacing the pin 57 shown in the preferred form previously described is a pin 174. This pin has an end 175 which tapers substantially to agree with the taper of the part 159. The pin 174 is mounted in the socket-like end of a sleeve 176 and retained there by a screwed rod 177, and this assembly is mounted within a housing 178 carried in the bracket 54. Near one end the housing 178 is provided with a groove 264, and the housing also has a shoulder 265 to engage one end of the bracket 54. The housing 178 is pushed through the bracket 54 and is retained in position by a forked key 262 which is pushed into the groove 264 and which engages the end 263 of the brackets 54. It will be seen that there is clearance between the sleeve 176 and the housing 178, this arrangement allowing the end 175 of the pin 174 to centre itself in the coiled wire entering the sleeve 158.

The pin 174, however, can be advanced towards the end of the sleeve 158, and for this purpose an adjustable nut 179 is provided screwing on to an extension 180 of the sleeve 178. The nut is provided with an internal flange 181, and on either side of this is a thrust bearing 182, one of these thrust bearings engaging a shoulder 183 on the sleeve 176, and the other one being engaged by a nut 184 on the screwed end of the sleeve 176.

Thus, when the nut 179 is turned in either direction, endwise movement of the pin 174 is produced, but the pin is free to make a limited floating movement, in any direction radial to its axis.

A lock nut 185 is provided for the nut 179, and a lock nut 186 is provided for the nut 184.

The plate 37 shown in Figures 4, 6 and 9 is replaced by the plate 187, this plate carrying the arms 53 and the part 54.

The means for guiding the wire and pressing it into the annular space between the sleeve 158 and the nose 175 of the pin 174 are shown in Figures 15 and 18A. On the end of the plate 187 are two facings 188 and 189. On the facing 188 is pivoted at 190 an adjustable bracket 191 carrying a guide pulley 192, the periphery of which is grooved to engage the wire 193. The bracket 191 can be turned about the pin 190 and fixed in any desired position by a locking screw 194 screwing into the plate 187 and engaging in a slot 195 in the bracket 191.

Adjustably mounted on the facing 189 are two brackets 196 and 197. Each of these brackets is provided with two slots 198 and 199, one of which is engaged by a pin 200 fixed to the plate 187, and the other of which is engaged by a screw 201 which can be screwed into the plate 187 to lock the bracket in any desired position. Each bracket is formed with a flange 202 which projects at right angles to the plane of the plate 187 and is parallel to the slots 198, 199, and to each of these flanges is pivoted at 203 a bracket 204 carrying at one end a rotatable roller 205 and at the other end a screw 206, the end of which engages a lug 207 on the appropriate bracket 196 or 197. It will be seen that both brackets 196 and 197 are adjustable parallel to the length of the flange 202, and both brackets 204 can be turned on their pivots 203 by turning the screw 206.

The rollers 205 may be flanged as shown, and each may have a half groove to engage the periphery of the wire. These rollers exert pressure on the wire as it begins to coil into the annular space between the coiling sleeve 158 and the nose 175. The position of the first coil in relation to the end of the sleeve 158 can be regulated by turning the screws 206.

Within the sleeve 157 is a guide tube 208 which is free to rotate independently of the sleeve 157.

The helically grooved member 78 shown in Figures 9 and 11 is replaced by a much longer helically grooved member 209, and at one end it is provided with a central projection 210 which gives the coil of wire a lead on to the grooved part.

At the opposite end the part 209 is provided with the step 83 described in connection with the construction shown in Figures 1 to 12, this step cooperating with the cutter for severing the ring or elements.

Figure 21:
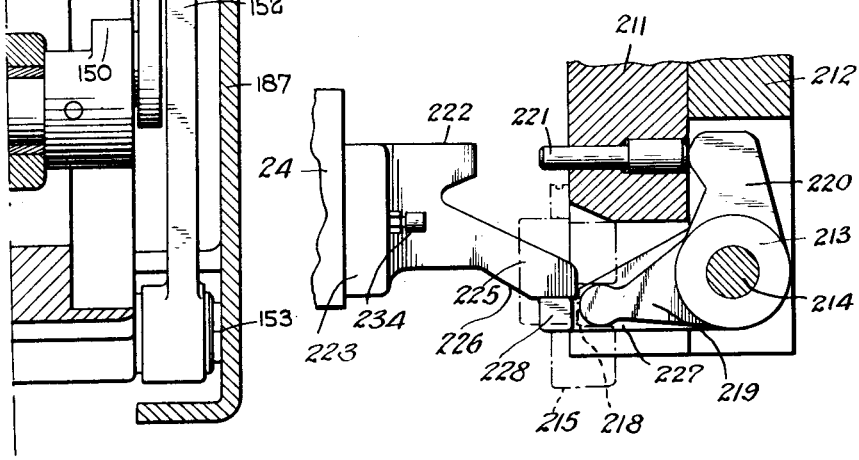
Figure 21 is a sectional plan view showing the means employed for operating the cutter.
Figure 19:
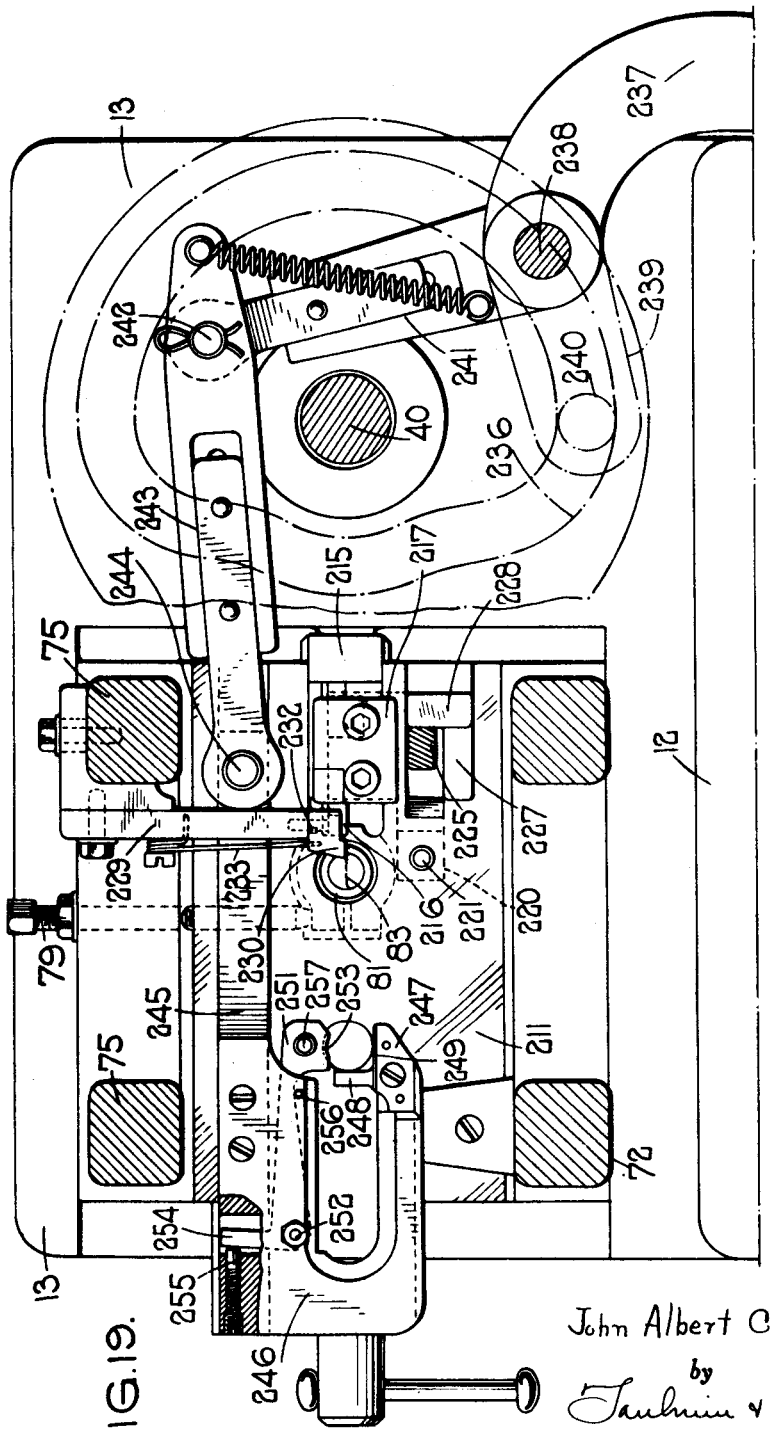
Figure 19 is a section on line 19—19 of Figure 14, showing the conveyor and its driving gear.

The means for severing the rings or elements and the stop co-operating with the end of the coil of wire are shown in Figures 18, 19 and 21.

The plate 73 shown in Figure 9 is replaced by the plate 211 (Figure 18), and the plate 69 (Figure 9) by the plate 212 (Figure 18). These two plates 211 and 212 are formed with openings so as to accommodate a three-armed lever 213 mounted on a pivot 214.

The plate 211 is formed with a guideway in which is a reciprocating slide 215 carrying a cutter 216 held in place by a clamping plate 217. The slide 215 is formed with a cavity 218 in which engages the end of one arm 219 of the lever 213. This arm serves to reciprocate the slide.

The lever 213 is actuated by the arm 220 which is engaged by a pin 221 adapted to be operated by a nose 222 on a bracket 223 attached to the end of the slide 24.

The bracket 223 is provided with an arm 225 formed at an incline 226, and the third arm 227 of the lever 213 has a portion 228 which engages the arm 225.

The arrangement is that the bracket 223 is reciprocated by the slide 24, and as it moves to the right as seen in Figure 21, the arm 225 moves beyond the part 228 and the nose 222 engages the end of the pin 221 which presses on the arm 220 and rocks the lever, causing the arm 219 to move the slide towards the coil of wire and co-operating with the step 83 to shear off one or more turns.

When the slide 24 makes its return movement, the incline 226 engages the part 228 of the arm 227 and thus rocks the lever 213 back into its original position.

In making washers from wire, it is important that the metal of each finished washer should have its ends in a common plane so that there is no gap between them. It is difficult to ensure that each rotary movement imparted to the coil shall be exactly one revolution, because the wire is held frictionally between the parts 158 and 175 and there may be slip, and for this reason driving gear for the sleeve 158 is preferably adjusted slightly to exceed one revolution at each operative stroke. For this reason a stop is provided adapted to engage the end of the wire at the cutting end and retain it in a definite position in relation to the plane where the shearing cut effected by the cutter 216 is situated. It will be appreciated that each ring-like element severed from the coil is of helical form, and that these elements are subsequently pressed into flat form. The flattening of the helical elements causes the ring to close slightly so that the ends of the wire approach each other. For this reason, it is necessary or desirable for each severed helical element to be slightly less than one complete turn, the flattening operation effected by the press tools causing the ends of the wire to move into contact. The stop 230 and the cutter 216 are therefore preferably arranged so that each element severed is slightly less than one complete turn. The driving gear for the coiling mechanism is preferably adjusted slightly to exceed one revolution at each operative stroke, and the excess movement is of course readily taken up by the coil. During the backward movement of the driving mechanism for the coiling gear, the torsion which has been produced in the coil by the excess movement is relieved by the sleeves 157 and 158 making the required backward movement. This movement is produced by the torsion in the coil itself, and as already explained, the friction brake permits of this movement.

The stop can be seen in Figures 18 and 19, and it is mounted upon a bracket 229 fixed to one of the parts 75. The stop itself is shown at 230 and is pivoted at 231 to the end of the bracket 229. The stop is in the form of a lever, one arm of which engages a stop pin 232 and the other arm of which is acted upon by a spring 233 and engages the end of the wire.

It is necessary for this stop to be movable so that it can move aside when the cutter 216 advances. The stop may be pushed aside by the cutter, but I prefer to provide an adjustable projection 234 on the bracket 223 which engages the arm 235 of the pivoted stop so that the stop is moved aside just as the cutter moves into its operative position. The stop 230 moves back into its operative position as the cutter recedes.

The modified conveyor means and the driving gear therefor are shown in Figures 13, 14, 19 and 20. The transmission shaft 40 is provided with a cam 236. This is placed adjacent the bevel wheel 39, so that the transmission shaft 40 will not have to transmit the torsion arising from pressure on the cam.

The machine body is provided with two bearings 237 carrying an oscillating shaft 238, on one end of which is a crank 239 having a pin or roller 240 engaging in the groove of the cam 236. By this means the shaft 238 is oscillated.

At the opposite end the shaft 238 is provided with a crank 241 which is made as shown in two parts adjustably secured together so that the effective length of the crank can be adjusted. This crank is pivoted at 242 to a link 243 which is also made in two parts adjustably secured together so that its effective length is adjustable, and the link 243 is pivoted at 244 to a reciprocating slide 245 which takes the place of the slide 97 shown in Figures 7 and 8.

The slide 245 carries a detachable gripper member 246. This gripper member can be detached and replaced by any one of larger or smaller size for dealing with larger or smaller diameters of rings or elements.

The gripper member 246 has a fixed jaw 247 provided with a stop pin 248 and having a straight serrated surface 249. The serrations 249 may be of ratchet form so as not unduly to resist the movement of the element out of the gripper by the punch 250 on the press tools.

Further, the serrations 249 are substantially tangential to the periphery of the ring or element.

The other jaw is shown at 251 and is pivoted at 252. This jaw has a curved and grooved surface 253 which embraces the periphery of the ring.

The jaw 251 is formed as a lever and has a second arm 254 acted upon by a spring-pressed pin 255 mounted in an opening in the body of the gripper, the jaw 251 engaging a stop 256.

Further, at the side the jaw 251 is provided with a projecting pin 257, the end 258 of which is tapered, and the punch 250 is provided with a conical shoulder 259 which engages the end of the pin 257 so as to impart an opening movement to the gripping jaw 251 as the punch moves to engage the ring or element as shown at 260 in Figure 20.

The modification in the ejecting means can be seen in Figures 13, 14 and 18, from which it can be seen that the lever 29 shown in Figure 4 is replaced by a lever 261 pivoted at 262 to the rod 31. The opposite end of the lever 261 is provided with an adjustable fulcrum formed between two pins 263 and 264. The pin 264 is acted upon by a spring 265 and the pin 263 has a screwed portion 266 so that it can be adjusted to move the pivot bodily. The lever 261 is formed with a cavity 267 engaged by the pin 263, and the lever is also provided with a projecting pin 268 which engages the end of the ejector rod 124. This arrangement has the advantage that the movement imparted to the ejector rod 124 by the lever 261 is less than the movement imparted to the rod 31 by the cam 25, so that any inaccuracies due to wear or other causes in the cam mechanism, instead of being increased at the ejector rod are decreased by the modified arrangement.

What I claim then is:

1. A machine for producing washers from wire, comprising a body with raised ends having at one end wire coiling mechanism, wire severing means, a conveyor, and press tools including a punch and an anvil, and having at the other end a driving shaft operating a pair of slides, one actuating one of the press tools, and the other actuating the wire severing means, the driving shaft also having a cam for producing a movement of the anvil to eject the pressed washer, a transmission shaft arranged transversely to said driving shaft and driven therefrom, and means on the transmission shaft for driving the conveyor and the wire coiling means.

2. A machine for producing washers from wire, comprising means for coiling the wire helically, means for severing the individual turns of the coil in succession to form rings, dies including a punch and an anvil, for pressing the rings into thin flat section, means for conveying the rings from the position where they are formed to the dies, ejector means for removing the washers from the dies, a driving shaft for driving the coiling, severing, pressing, conveying and ejecting means, said coiling means comprising a coiling sleeve, a pin projecting into the end of said sleeve, means operated by the driving shaft imparting an intermittent rotary movement to said sleeve, and means for guiding the wire into the annular space between the interior of the sleeve and the exterior of the pin.

3. A machine according to claim 2, wherein the means imparting the intermittent rotary movement to the sleeve are adjustable so as to be capable of imparting thereto a movement equal to, slightly in excess of, or slightly less than one revolution of the sleeve at each stroke, whereby the length of wire in the severed ring can be controlled.

4. A machine according to claim 2, wherein the means for imparting intermittent rotary movement to the sleeve comprises a transmission shaft receiving motion from the driving shaft, a crank on the transmission shaft, a pivotally mounted oscillating toothed quadrant, a link pivoted to said crank and to said quadrant, a pinion mounted for free rotation concentrically with said sleeve and gearing with said quadrant, means on said pinion carrying a pawl, and ratchet teeth in driving connection with said coiling sleeve, said pawl engaging said ratchet teeth.

5. A machine according to claim 2, wherein the wire guiding means comprises a roller engaging the wire by its periphery adjacent said annular space, a bracket supporting said roller, said bracket being adjustable so that the roller can be made to press the wire into said annular space.

6. A machine according to claim 2, comprising a transmission shaft receiving motion from the driving shaft, a crank on the transmission shaft, a pivotally mounted oscillating toothed quadrant, a link pivoted to said crank and to said quadrant, a pinion mounted for free rotation concentrically with said sleeve and gearing with said quadrant, means on said pinion carrying a pawl, means having ratchet teeth, said means being in driving connection with said coiling sleeve, said pawl engaging said ratchet teeth, and a friction brake operating on said coiling sleeve.

7. A machine according to claim 2, wherein the pin is free to move transversely to its axis so that it can center itself in relation to the wire coil entering the coiling sleeve.

8. A machine according to claim 2, comprising a stop for the end of the wire, automatic means for moving said stop, a reciprocating cutter for severing the turns of the coil, a lever for operating said cutter, and a slide driven by the driving shaft for moving said lever.

9. A machine according to claim 2, comprising a stop for the end of the wire, a reciprocating cutter for severing the turns of the coil, a lever for operating said cutter, a slide driven by the driving shaft for moving said lever, a bracket on the slide, said lever having three arms, one of which is engaged by said bracket for rocking the lever, another of which drives the cutter, and the other of which engages said bracket on the reverse movement of the slide to produce the return movement of the lever.

10. A machine for producing washers from wire, comprising a driving shaft, a transmission shaft receiving at one end motion from said driving shaft, means for coiling the wire helically, means for severing the individual turns of the coil in succession to form rings, dies including a punch and an anvil, for pressing the rings into thin flat section, means for conveying the rings from the position where they are formed to the dies, said conveying means comprising a slide having gripping means, a cam fixed on the transmission shaft near the end at which it is driven, an oscillating shaft arranged parallel to said transmission shaft, a driving crank on said oscillating shaft, said crank having means engaging said cam, a driven crank on the oscillating shaft, and a link pivoted to said driven crank and to the slide.

11. A machine for producing washers from wire, comprising means for coiling the wire helically, means for severing the individual turns of the coil in succession to form rings, dies including a punch and an anvil, for pressing the rings into thin flat section, means for conveying the rings from the position where they are formed to the dies, comprising gripping means having a fixed jaw and a spring-pressed pivoted jaw, the latter having means operable by the punch to open the gripper as the punch moves towards the gripper.

12. A machine for producing washers from wire, comprising means for coiling the wire helically, means for severing the individual turns of the coil in succession to form rings, dies including a punch and an anvil, for pressing the rings into thin flat section, means for conveying the rings from the position where they are formed to the dies, comprising gripping means having a pair of jaws one of which partially embraces the ring and the other of which has serrations disposed substantially tangentially to the circumference of the ring.

13. A machine for producing washers from wire comprising means for coiling the wire helically, said coiling means comprising a positively driven open-ended sleeve and a taper pin projecting into said sleeve, the wire being fed into the annular space between the pin and the sleeve, means for severing the individual turns of the coil in succession to form rings, dies including a punch and an anvil for pressing the rings into thin flat section, means for conveying the rings from the position where they are formed to the dies, and ejector means for removing the washers from the dies.

14. A machine for producing washers from wire comprising means for coiling wire helically, means for severing the individual turns of the coil in succession to form rings, dies including a punch and an anvil for pressing the rings into thin flat section, means for conveying the rings from the position where they are formed to the dies, said conveying means comprising a pair of gripping jaws, and automatic means to open said jaws after the ring held thereby has been engaged on opposite sides by the pressing dies, and ejector means for removing the washers from the dies.

JOHN ALBERT CHAPPUIS.